No. 815,971. PATENTED MAR. 27, 1906.
J. T. MULVANEY & C. F. KELLER.
COMBINED BOTTLE HOLDER AND OPENER.
APPLICATION FILED OCT. 17, 1905.
2 SHEETS—SHEET 1.
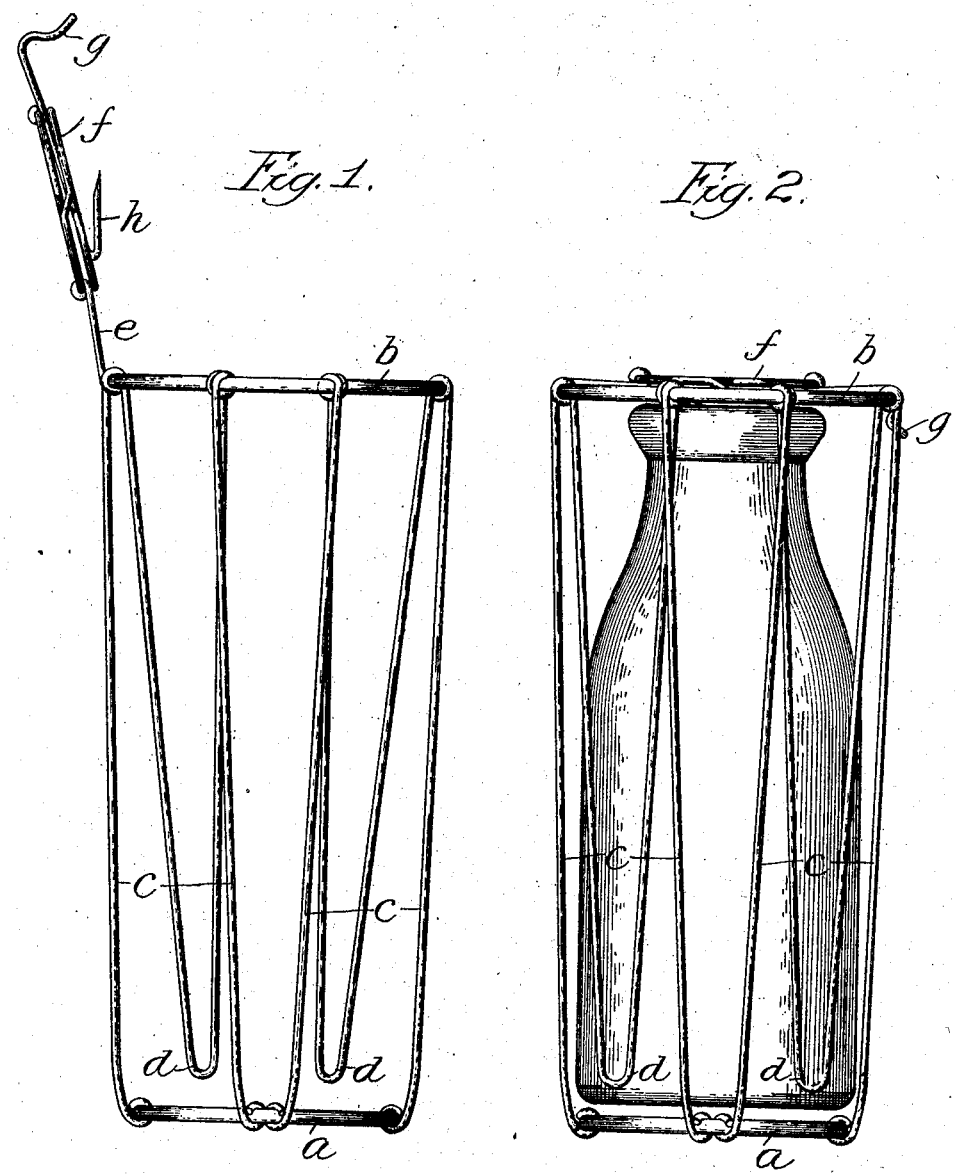
Witnesses:
Chas. E. Gaylord.
John Enders.
Inventors:
James T. Mulvaney &
Charles F. Keller,
By Thomas F. Sheridan,
Atty.

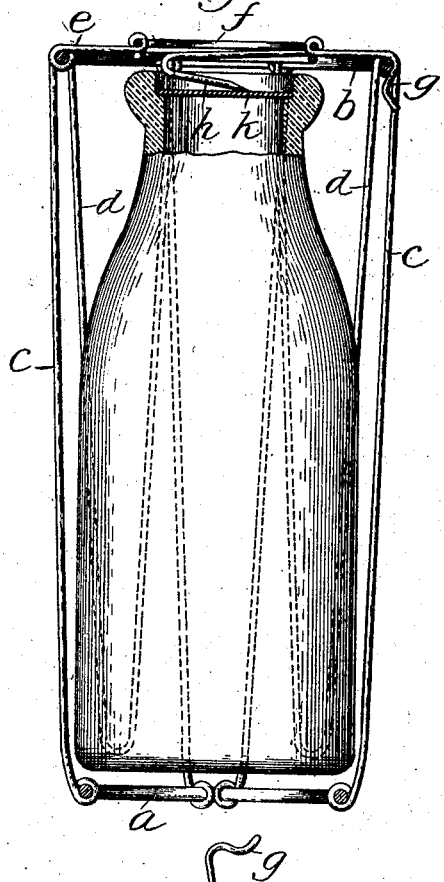
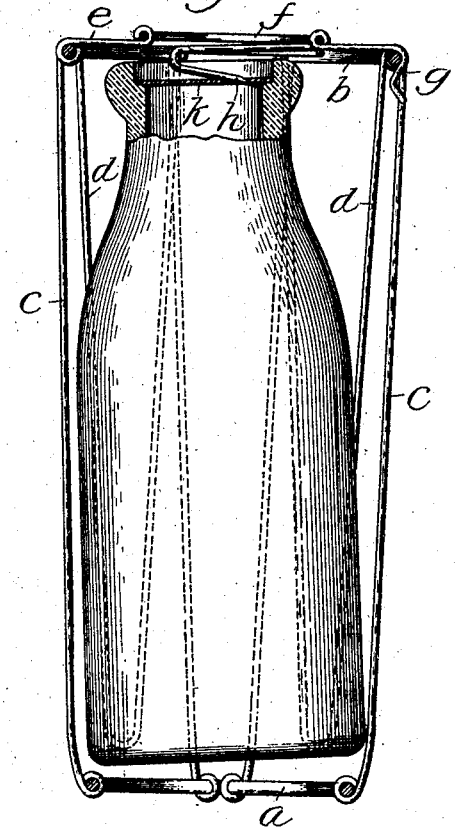
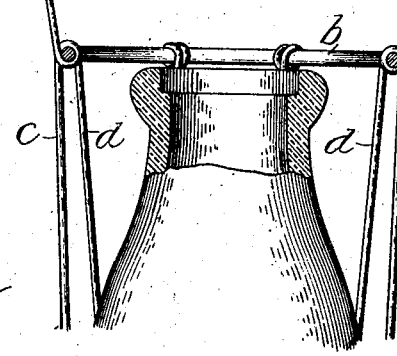

UNITED STATES PATENT OFFICE.

JAMES T. MULVANEY AND CHARLES F. KELLER, OF CHICAGO, ILLINOIS.

COMBINED BOTTLE HOLDER AND OPENER.

No. 815,971.      Specification of Letters Patent.      Patented March 27, 1906.

Application filed October 17, 1905. Serial No. 283,175.

*To all whom it may concern:*

Be it known that we, JAMES T. MULVANEY and CHARLES F. KELLER, citizens of the United States, residing at Chicago, in the county of Cook and State of Illinois, have invented certain new and useful Improvements in a Combined Bottle Holder and Opener, of which the following is a specification.

Our invention relates to a bottle holder and opener in which the bottle is opened by opening the cover of the casing.

The object of our invention is to produce a simple, cheap, and efficient bottle holder and opener.

In the drawings, Figure 1 is a side elevation of our improved holder, the cover being raised; Fig. 2, a side elevation showing the cover closed and a bottle held in the casing, and Figs. 3, 4, and 5 are sectional elevations illustrating the removal of a cover from the bottle.

Referring to the drawings, $a$ and $b$ are lower and upper rings connected by uprights $c$, of wire, forming a casing for holding a bottle. Attached to the upper ring $b$ and depending therefrom are resilient loops of wire $d$, extending inwardly toward the center of the casing and adapted to engage the bottle and hold it out of contact with the casing.

It will be observed that the bottle is held out of contact not only with the sides of the casing, but also with the bottom thereof. Hinged to the upper ring by loops $e$ is a cover $f$, having a resilient hook $g$ attached thereto, which engages with the upper ring to secure the cover in closed position. Attached to this cover on the under side thereof is a resilient hooked arm $h$, provided with a pointed hook. This arm is adapted to rest upon the cover of the bottle, which is shown as an ordinary milk-bottle provided with a paper cover or cap, as is well understood. When the cover of the casing is in closed position, this resilient hook bears tightly against the bottle-cover. When it is desired to remove the cap from the bottle, the bottle is tilted back, so that the pointed hook is forced into the paper cap. When the casing-cover is raised, the hook removes the paper cap from the bottle, as will be readily understood. This operation is clearly shown in Figs. 3, 4, and 5.

It will be seen that we have provided a bottle-holder in which the bottle is securely held in such a way that injury to it by reason of sudden shocks in transportation will be entirely obviated.

We claim—

1. A bottle-holder, comprising upper and lower rings, uprights connecting the rings, and springs extending from one of the rings to a point intermediate the rings, whereby a bottle may be retained in the holder out of contact therewith.

2. A bottle-holder having a casing for receiving a bottle, and springs attached to the casing for holding the bottle away from the casing.

3. A bottle-holder having a casing for receiving a bottle, and inturned resilient loops for holding the bottle normally above the bottom of the casing.

4. A bottle-holder comprising upper and lower rings of wire, wire uprights connected to the rings and spacing them apart and forming a casing for the bottle, and depending resilient loops attached to the casing bent inwardly toward the center of the holder.

5. A bottle-holder, comprising a casing having resilient bottle-holding means attached thereto, and a cover provided with a catch hinged to the casing.

6. A combined bottle holder and opener, comprising a casing, a cover provided with a catch hinged to the casing, and an opening device fixed to the inside of the cover.

7. A combined bottle holder and opener, comprising a casing, a cover hinged thereto, and a pointed resilient hook attached to the inside of the cover.

JAMES T. MULVANEY.
              CHARLES F. KELLER.

Witnesses:
   ANNIE C. COURTENAY,
   JENNIE A. MACEDWARD.